US008045778B2

(12) United States Patent
Blaffert et al.

(10) Patent No.: US 8,045,778 B2
(45) Date of Patent: Oct. 25, 2011

(54) HOT SPOT DETECTION, SEGMENTATION AND IDENTIFICATION IN PET AND SPECT IMAGES

(75) Inventors: Thomas Blaffert, Hamburg (DE); Kirsten Meetz, Hamburg (DE); Zuo Zhao, Palo Alto, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1439 days.

(21) Appl. No.: 11/749,218

(22) Filed: May 16, 2007

(65) Prior Publication Data

US 2008/0050000 A1    Feb. 28, 2008

Related U.S. Application Data

(60) Provisional application No. 60/747,453, filed on May 17, 2006.

(51) Int. Cl.
*G06K 9/00* (2006.01)
(52) U.S. Cl. ........ 382/131; 382/128; 382/130; 382/133; 382/199; 128/659; 128/653.1
(58) Field of Classification Search .............. 382/128, 382/129, 130, 131, 132, 133, 199; 128/659, 128/653.1, 656; 600/425, 436; 250/369
See application file for complete search history.

(56) References Cited

U.S. PATENT DOCUMENTS

| 5,381,791 | A | 1/1995 | Qian |
| 7,024,028 | B1 | 4/2006 | Shalev |
| 7,574,304 | B2 * | 8/2009 | Jackway et al. ............ 702/19 |
| 7,711,160 | B2 * | 5/2010 | O'Donnell et al. ........... 382/128 |
| 7,822,246 | B2 * | 10/2010 | Senegas et al. ............... 382/128 |
| 2005/0033143 | A1 | 2/2005 | O'Donnell et al. |
| 2005/0058322 | A1 | 3/2005 | Farmer et al. |
| 2005/0261577 | A1 | 11/2005 | Ficaro et al. |

OTHER PUBLICATIONS

Acton, "Automatic Segmentation of Dynamic Neuroreceptor Single-Photon Emission Tomography Images Using Fuzzy Clustering", European J. of Nucl. Med., V. 26, No. 6, Jun. 1999.
Dornheim, et al., "Automatic Segmentation of the Left Ventricle in 3D SPECT Data by Registration with Dynamic Anatomic Model", Ed. Duncan, et al., MICCAI 2005, LNCS 3749, p. 335-342 2005.
Franz, et al., "Modular Toolbox for Derivative-Based Medical Image Registration" Med. Imaging 2005: Image Processing, Ed. Fitzpatrick, Proc. of SPIE vol. 5747.
Germano, et al., "Automatic Reorientation of Three-Dimensional, Transaxial Myocardial Perfusion SPECT Images", J. Nucl. Med 1995; 36:1107-1114.
Lau, et al. "Advanced PET/CT Fusion Workstation for Oncology Imaging", Medical Imaging 2005: Visualization, Image Guided Procedures, and Display, ed. Galloway, et al. Proc. of SPIE vol. 5744.

(Continued)

Primary Examiner — Samir Ahmed
Assistant Examiner — Ali Bayat

(57) ABSTRACT

A potential region of interest segmentation device segments an image data into regions of potential interest. From the regions of potential interest, an identifying device identifies a region of interest including an object of interest based on a set of rules. A recognizing device differentiates among the identified objects of interest and selects at least one particular object of interest.

18 Claims, 7 Drawing Sheets

OTHER PUBLICATIONS

Pohle, et al., "Segmentation of the Left Ventricle in 4D-dSPECT Data Using Free Form Deformation of Super Quadrics", Med. Imaging 2004: Image Processing ed. Fitzpatrick, et al. Proc. of SPIE vol. 5370.

Riddell, et al. "The Watershed Algorithm: A Method to Segment Noisy PET Transmission Images", IEEE Trans. on Nucl. Science, vol. 46, No. 3, Jun. 1990.

Vincent, et al., "Watershets in Digital Spaces: An Efficient Algorithm Based on Immersion Simulations", IEEE Trans. on Pattern Analysis and Machine Intelligence, vol. 13, No. 6, Jun. 1991.

Wiemker, et al. "Computer Aided Lung Nodule Detection on High Resolution CT Data" Medical Imaging 2002: Image Processing, ed. Sonka, et al. Proc. of SPIE Vo. 4684.

* cited by examiner

HOT SPOT DETECTION, SEGMENTATION AND IDENTIFICATION IN PET AND SPECT IMAGES

CROSS REFERENCE TO RELATED APPLICATIONS

This application claims the benefit of U.S. provisional application Ser. No. 60/747,453 filed May 17, 2006, which is incorporated herein by reference.

BACKGROUND

The present invention relates to the diagnostic imaging systems and methods. It finds particular application in conjunction with the Positron Emission Tomography (PET) and Single Photon Emission Tomography (SPECT) systems and will be described with particular reference thereto. It will be appreciated that the invention may also be applicable to other imaging modalities.

Nuclear medicine imaging employs a source of radioactivity to image a patient. Typically, a radiopharmaceutical is injected into the patient. Radiopharmaceutical compounds contain a radioisotope that undergoes gamma-ray decay at a predictable rate and characteristic energy. One or more radiation detectors are placed adjacent to the patient to monitor and record emitted radiation. Sometimes, the detector is rotated or indexed around the patient to monitor the emitted radiation from a plurality of directions. Based on information such as detected position and energy, the radiopharmaceutical distribution in the body is determined and an image of the distribution is reconstructed to study the circulatory system, radiopharmaceutical uptake in selected organs or tissue, and the like.

Nuclear medicine imaging has been increasingly used in cancer imaging due to the success of the tracer [18F]-fluorodeoxyglucose (FDG). Focal areas of abnormally increased FDG uptake are typical for many types of cancer. The main areas of interest are the diagnosis, staging, and monitoring of response to the treatment. A metabolic change can be established by comparing uptake values from pre-treatment and post-treatment scans. The FDG-PET imaging is also important for therapy planning, e.g. for dose planning. For such applications, the accurate localization and quantization of metabolic activity is essential. Often, the PET images are combined with the CT images of the same anatomical region. Typically, after the registration, the images are manually evaluated for localization and quantization of metabolic activity. Although, the hot spots are typically easily identified in the PET images, marking and delineation of the hot spots, however, are tedious tasks which slow down the overall workflow.

Another important area of the PET/SPECT imaging is myocardial perfusion imaging, where uptake of a tracer substance that contains a suitable radionuclide, such as Tc-99m, indicates the health condition of cardiac regions. Typically, the transaxial images, reconstructed from projection data, are reoriented into short-axis images. Short-axis images, which are perpendicular to the long axis of the left ventricle (LV), allow standardization of display and interpretation of images, and also make it possible to present 3D information in 2D polar maps, which is the current standard for quantification.

Current methods for determining the long axis of the left ventricle are based on models. Typically, such methods require the initial identification of the heart and initial model placement, which is followed by a model fitting procedure. The heart is typically segmented based on a global threshold. However, since the separation of different regions and the occurrence of noise spots strongly depend on the threshold setting, this methodology is often inaccurate. Another problem with automated thresholding procedures is that other organs with a high intensity, e.g. liver, might be selected instead of the heart. On the other hand, if the threshold is set high, the connectedness of the heart regions might disappear for infarcted cases.

The accurate initial placement is crucial for the model fitting algorithms. Initial misalignments can lead to invalid model positions. Besides, some additional constraints, for example, the approximate area and the shape of the heart, need to be incorporated in order to successfully fit the model. These constraints are camera dependent, and the parameters need to be adjusted for different cameras.

The present application provides new and improved methods and apparatuses which overcome the above-referenced problems and others.

BRIEF SUMMARY

In accordance with one aspect, an apparatus is disclosed. A potential region of interest segmentation device segments an image data into regions of potential interest. From the regions of potential interest, an identifying device identifies a region of interest including an object of interest based on a set of rules. A recognizing device differentiates among the identified objects of interest and selects at least one particular object of interest.

In accordance with another aspect, an imaging method is disclosed. An image data is segmented into regions of potential interest. From the regions of potential interest a region of interest including an object of interest is identified based on a set of rules. The identified objects of interest are differentiated. At least one particular object of interest is selected.

In accordance with another aspect, a processor or computer medium is disclosed which is programmed to perform the steps of: segmenting an image data into regions of potential interest; from the regions of potential interest, identifying a region of interest including one or more objects of interest identified based on a set of rules; differentiating among the identified objects of interest; and selecting at least one particular object of interest.

In accordance with another aspect, an imaging method is disclosed. An image data is segmented into regions of potential interest. Based on a set of rules, a particular object of interest is identified in one region of potential interest. A pre selected model is fit with the identified object of interest. A long axis in the identified object of interest is determined. Two short axes in the identified object of interest are determined, the short axes extending perpendicularly to the long axis.

One advantage is that an object of interest is automatically located and segmented.

Still further advantages of the present invention will be appreciated to those of ordinary skill in the art upon reading and understand the following detailed description.

DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

Figure 1:
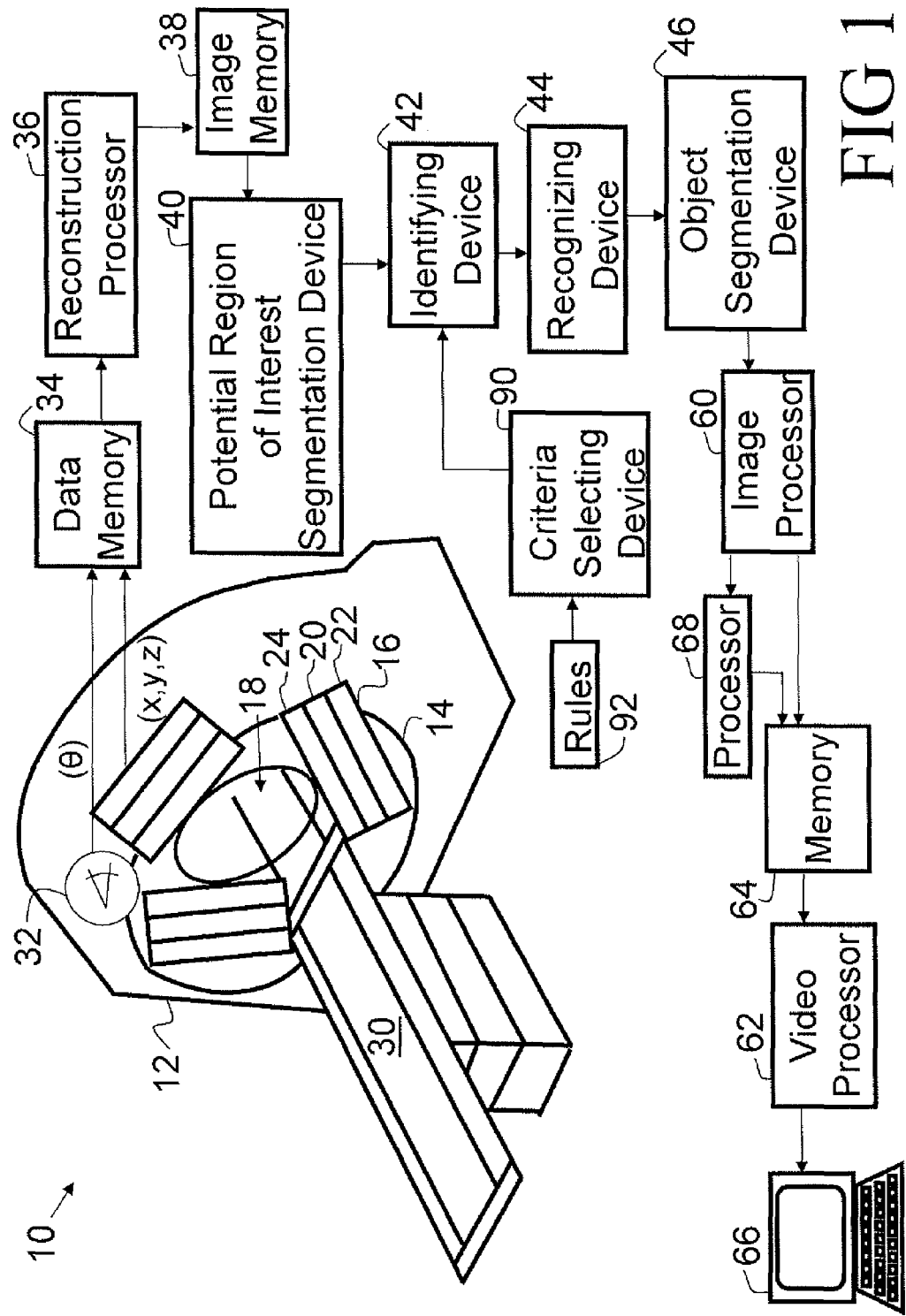
FIG. 1 is a diagrammatic illustration of an imaging system.

With reference to FIG. 1, a nuclear imaging system 10 typically includes a stationary gantry 12 that supports a rotatable gantry 14. One or more detection heads 16 are carried by the rotatable gantry 14 to detect radiation events emanating from a region of interest or examination region 18. Alternatively, particularly in a PET scanner, the examination region is typically surrounded by a ring of stationary detector heads. Each detection head 16 includes a detector 20 which includes two-dimensional arrays of detector elements such as a scintillator and light sensitive elements, e.g. photomultiplier tubes, photodiodes, and the like. Direct x-ray to electrical converters, such as CZT elements, are also contemplated. Each head 16 includes circuitry 22 for converting each radiation response into a digital signal indicative of its location (x, y) on the detector face and its energy (z). The location of an event on the detector 20 is resolved and/or determined in a two dimensional (2D) Cartesian coordinate system with nominally termed x and y coordinates. However, other coordinate systems are contemplated. Particularly, in a SPECT scanner, a scatter grid and/or collimator 24 controls the direction and angular spread, from which each element of the detector 20 can receive radiation. The collimator limits the reception of radiation only along known rays. Thus, the determined location on the detector 20 at which radiation is detected and the angular position of the camera 16 define the nominal ray along which each radiation event occurred.

Typically, an object or patient to be imaged is injected with one or more radiopharmaceuticals or radioisotopes and placed in the examination region 18 supported by a couch 30. Few examples of such isotopes are F-18, C-11, Tc-99m, Ga67, and In-111. The presence of the radiopharmaceuticals within the object produces emission radiation from the object. Radiation is detected by the detection heads 16 around the examination region 18 to collect the projection emission or coincidence data.

The projection emission data, e.g. the location (x, y), energy (z), and an angular position (θ) of each detection head 16 around the examination region 18 (e.g., obtained from an angular position resolver 32) are stored in a data memory 34. A reconstruction processor 36 converts the SPECT or PET data into a three dimension image or map of radioisotope distribution which is stored in an image data 38. As discussed in detail below, a potential region of interest identifying or segmentation device, processor, algorithm or means 40 identifies regions of potential interest, e.g. regions which include a potential hot spot or object of interest. An identifying device, algorithm, processor or means 42 identifies regions of interest that include objects of interest based on identification criteria. A recognizing device, algorithm, processor or means 44 distinguishes between identified objects of interest to define a particular object of interest such as, for example, a left ventricle of the heart, a tumor, or the like. An object segmentation device, algorithm, processor or means 46 isolates a recognized object of interest from the rest of the tissue.

An image processor 60 processes the segmented image data into a volumetric image representation. A video processor 62 receives slices, projections, 3D renderings, and other image information from a memory 64 and appropriately formats an image representation for display on one or more human viewable displays, such as a video monitor 66, printer, storage media, or the like. Optionally, a further processing is performed to optimize the segmented image. In the example of the left ventricle, a processor 68 may refine the accuracy with which the long axis identified, such that the short axis slices are more accurate and reproducible in future imaging sessions.

Figure 2:
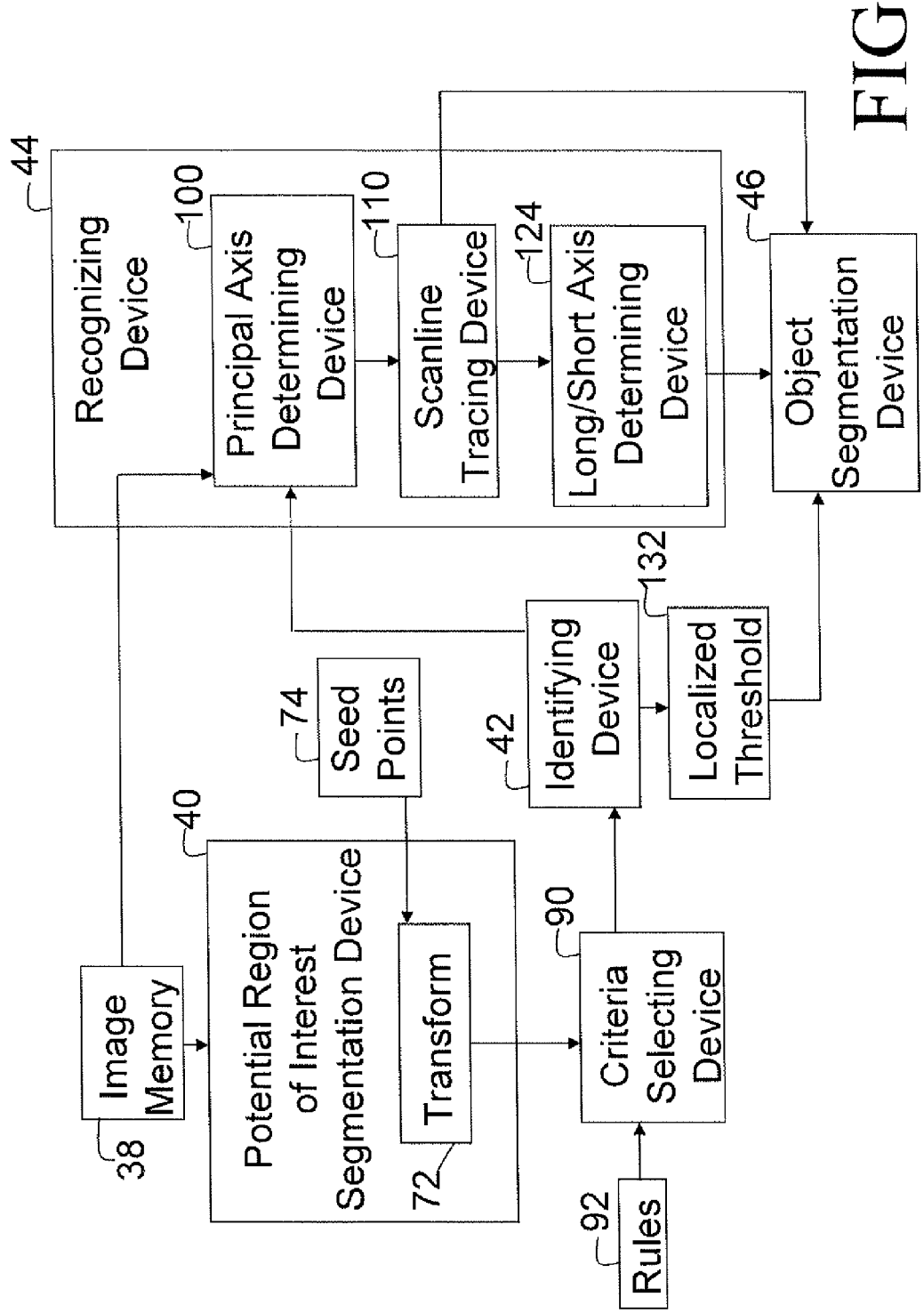
FIG. 2 is a diagrammatic illustration of a detailed portion of an imaging system.

With continuing reference to FIG. 1 and further reference to FIG. 2, the potential region of interest segmentation device or means 40 segments the image data into regions which include a potential hot spot or object of interest. For example, the potential region of interest segmentation device 40 performs a watershed transform or algorithm 72 on the raw image data. As a result, the image data is presented as a topographic image in which each pixel's grayscale value stands for an elevation at this point. Particularly, starting points or seed points 74 are identified in a data volume. For example, the seed points 74 are the points, which have high grayscale values and can be selected manually or automatically. In this embodiment, high connotes relative to the grayscales of adjacent pixels rather than as compared to a predicted threshold. The grayscale values of the image data are classified into groups or classes, such as 200, 500, 1000 gray levels which represent elevation plateaus or topographic surfaces. The available elevations step down from each selected seed point. The "water flood" starts from the seed points and keeps propagating downhill in a loop until it meets the water flood from the adjacent region.

Figure 3:
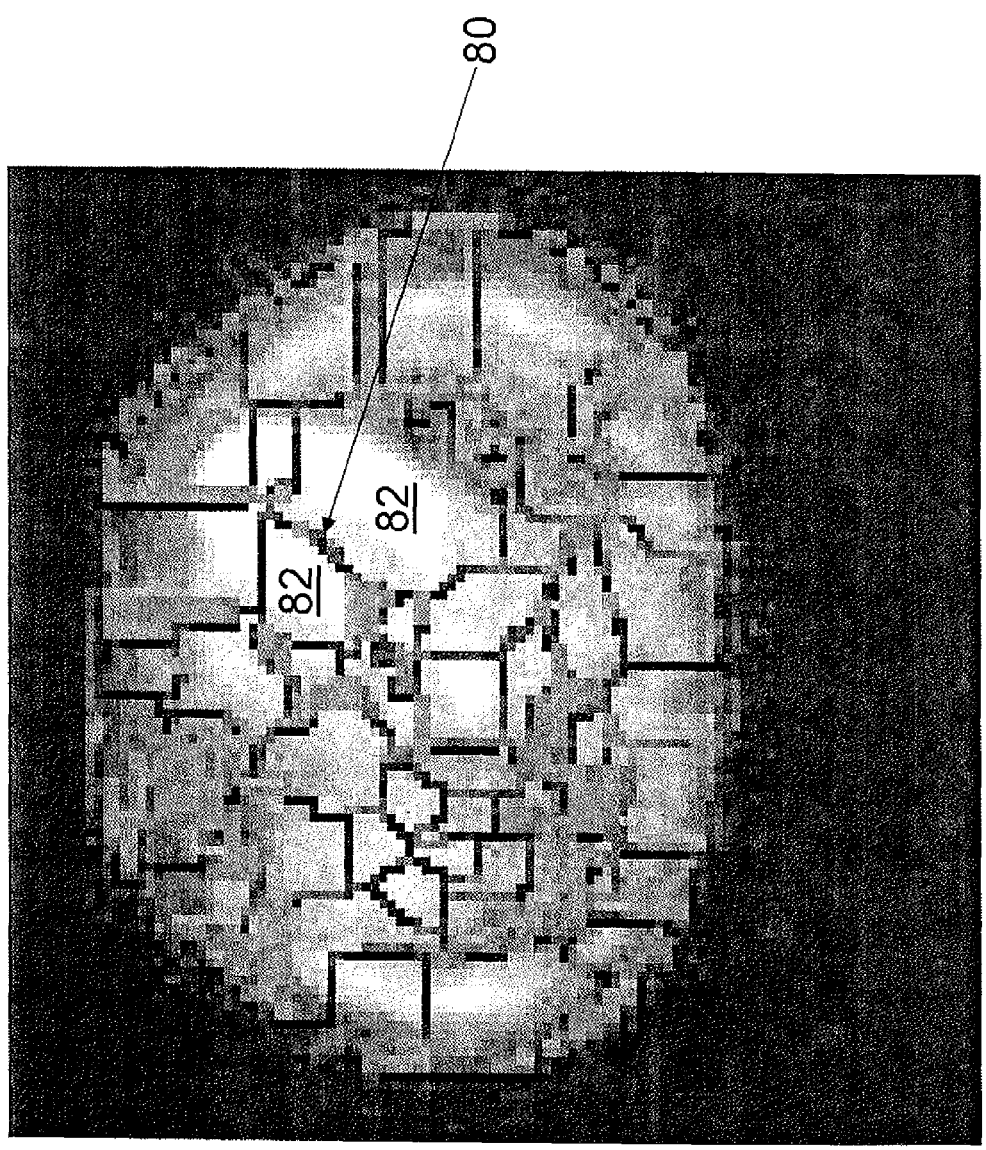
FIG. 3 is an image of a segmented image data.

With reference to FIG. 3, the stepped down regions of two adjacent selected seed points meet at the low level represented by pixels with low grayscale values and form dividing lines or boundaries 80 between identified regions of potential interest 82. Each segmented region of potential interest 82 represents a "target" area for subsequent processing.

Figure 4:
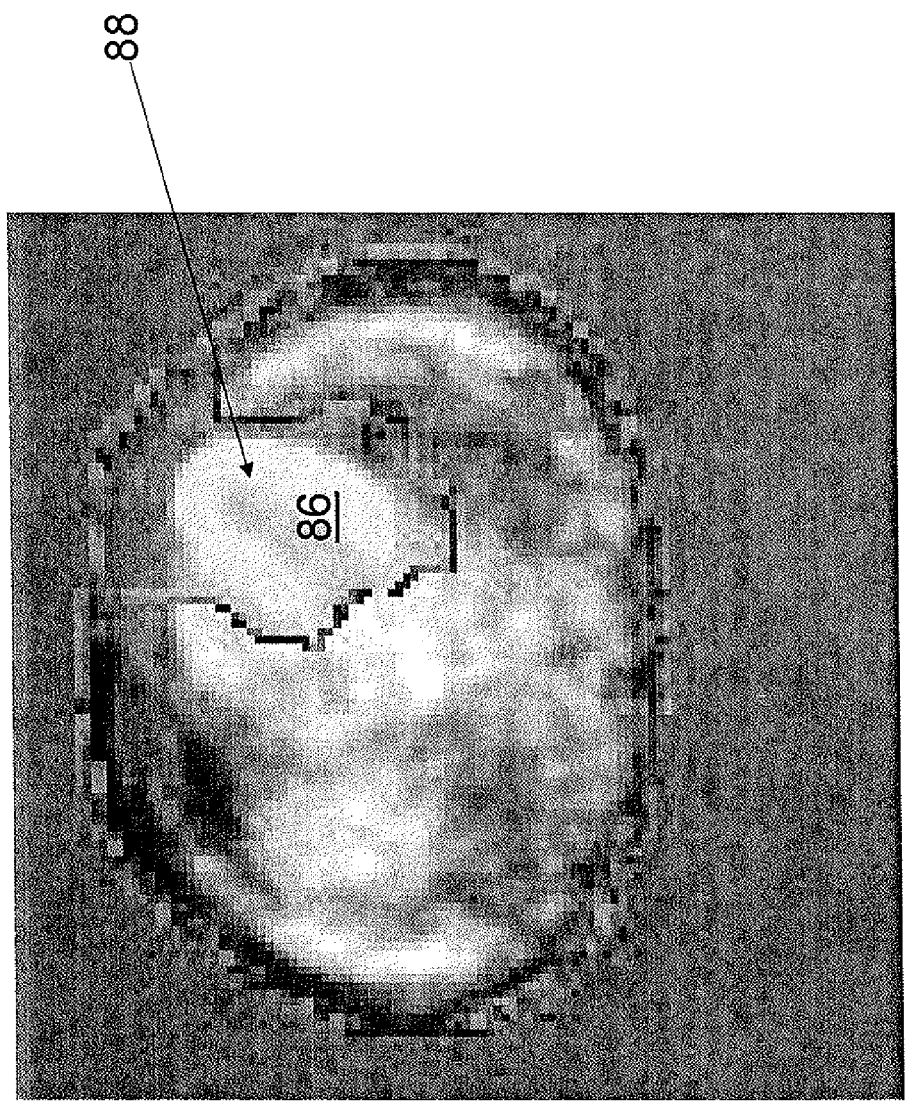
FIG. 4 is an image of a segmented region of interest.

With reference again to FIGS. 1 and 2 and further reference to FIG. 4, from a plurality of the regions of potential interest, the identifying device, algorithm, processor or means 42 identifies region or regions of interest 86 that each includes an object of interest 88 based on identification criteria. More specifically, a criteria selecting device, algorithm, processor or means 90 selects identification criteria based on a set of rules 92. The rules might be based on known geometrical shapes of the objects, expected size of the object, expected location of the object within the image, can be adaptive based on a series of identified objects, etc. Further, the rules might be based on statistical properties of the image such as maximum, minimum and average grayscale values and grayscale deviation. In one embodiment, the rules 92 are application specific, e.g. the rules are written to identify a left ventricle of the heart, a tumor, or the like. In another embodiment, the rules 92 are general, e.g. the rules are written to identify any object of importance such as heart, tumor, liver and the like. For example, the set of rules 92 might include rules to exclude artifacts, rules to help to identify the hot spot or object of interest 88, such as a heart or a tumor, and the like. For example, the rules to exclude artifacts might include rules to exclude regions, which have pixels with maximum grayscale values exceeding a first predetermined max $T_{H1}$. The rules to help to identify the object of interest might include rules to exclude regions which have pixels with maximum grayscale values less than or equal to the first threshold $T_{H1}$ but exceeding a second predetermined max $T_{H2}$ which is lower than the first threshold $T_{H1}$, and also in which the average grayscale value of pixels is exceeding a predetermined average grayscale value threshold $T_{AVE}$. The rules to help to identify the left ventricle of the heart might include rules describing the left ventricle as an elongated structure, which typically terminates in a pointed or conical end, and is located normally on the left side of the imaging subject and more posterior than the right ventricle.

The recognizing device, algorithm, processor or means 44 distinguishes between the identified objects of interest 88 to define or classify a particular object of interest such as, for example, a left ventricle of the heart. A principal axes determining device, algorithm, processor or means 100 determines first, second and third principal or rotational axes 102, 106, 108 of the identified object of interest 88 based on the algorithms known in the art, e.g. eigenvectors of the inertia tensor. The third principal axis 108 is shown as phantom lying perpendicularly to the surface of FIG. 5.

Figure 5:
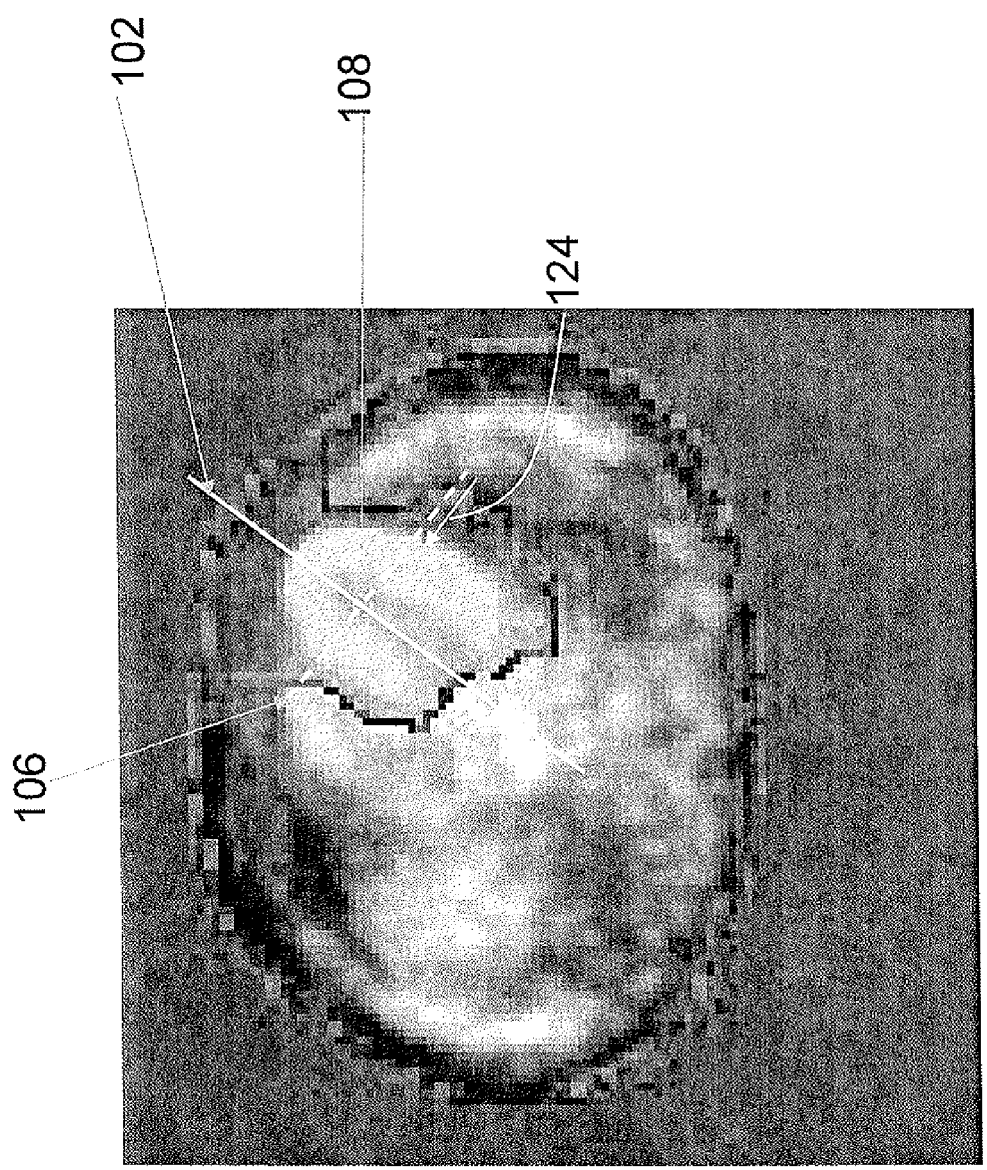
FIG. 5 is an image showing an object of interest with principal axes.
Figure 6:
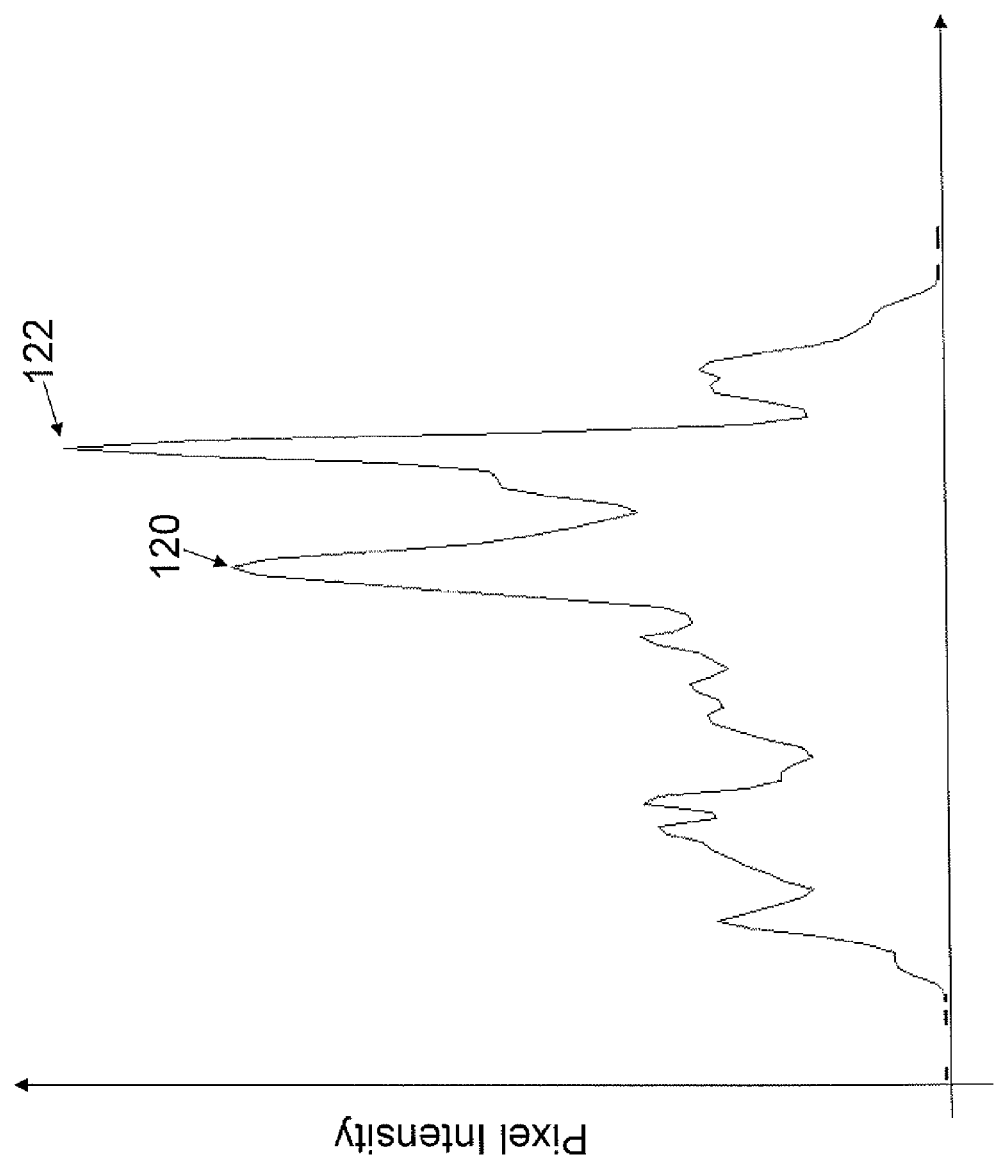
FIG. 6 is a graph of a grayscale intensity along an exemplary scanline.

With continuing reference to FIGS. 2 and 5 and further reference to FIG. 6, a scanline tracing device, algorithm, processor or means 110 scans along the first, second and third principal axes 102, 106, 108 and determines a number of maxima points or grayscale peaks. For example, if two grayscale peaks 120, 122 are found along at least one of the principal axes 102, 106, 108, as shown on the graph of FIG. 6, the identified object of interest is the left ventricle of the heart. E.g., as the second axis 106 is being traced in a direction 124, the grayscale intensity of the image of the left ventricle changes from (a) dark to bright, (b) bright to dark, (c) dark to bright and again (d) bright to dark, as reflected by two grayscale intensity peaks 120 and 122. A long/short axes determining device, algorithm, processor or means 126 determines which of the first, second, third principal axes 102, 106, 108 is a long axis and which are the short axes. For the left ventricle of the heart, the long axis lies through the apex of the left ventricle, the short axes lie perpendicularly to the long axis and the center of gravity lies in the middle of the ventricle. Accordingly, as denoted in FIG. 5, the first principal axis 102 is a long axis, and the second, third principal axes 106, 108 are the short axes.

Figure 7:
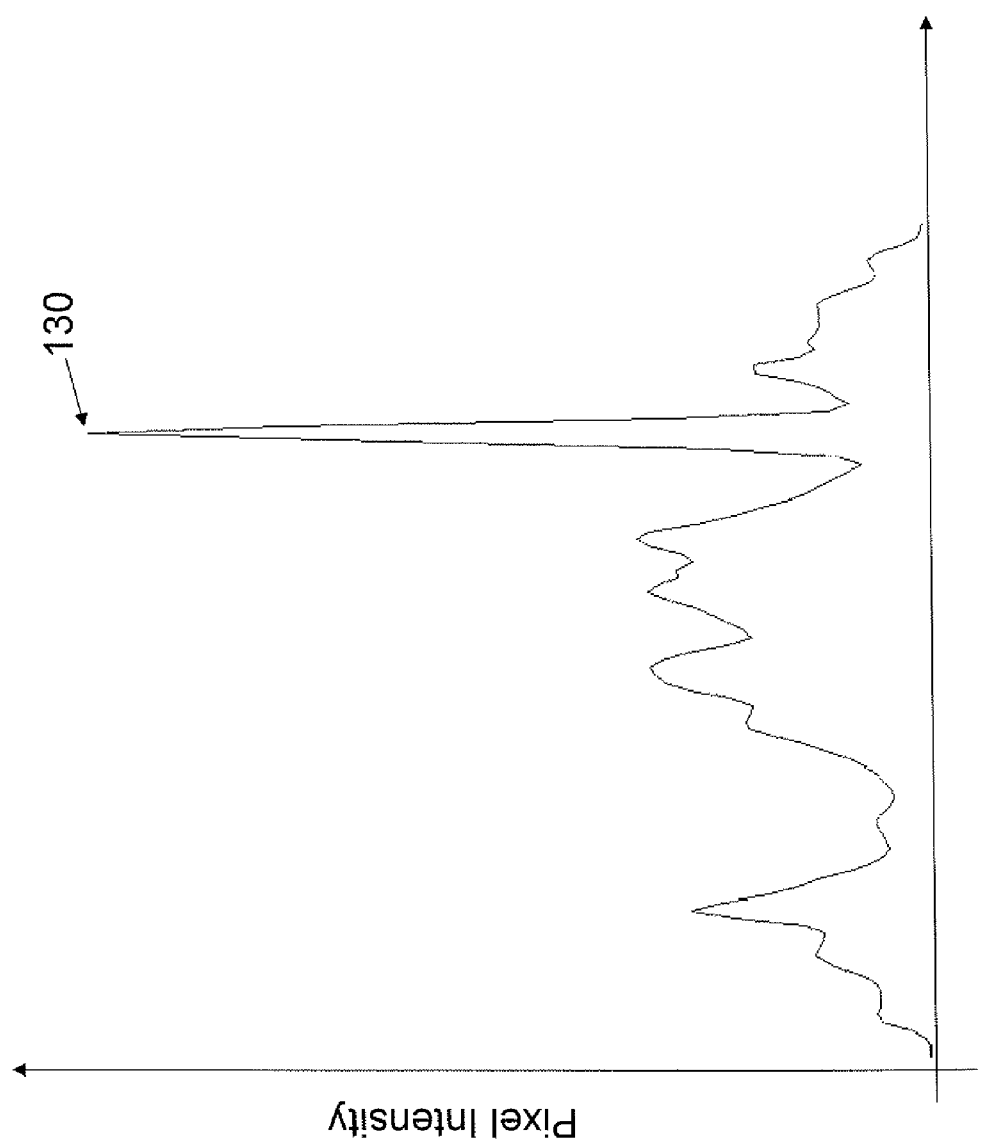
FIG. 7 is a graph of a grayscale intensity along another exemplary scanline.

With continuing reference to FIGS. 2 and 5 and further reference to FIG. 7, if a single grayscale peak 130 is found along each of the principal axes 102, 106, 108, the identified object of interest, for example, is a tumor. The image of the tumor, typically, is imaged as a bright spot with a center of gravity close to the center of the mass. E.g., as the principal axes are being traced, the grayscale intensity changes from dark to bright and from bright to dark, as reflected by a single grayscale peak 130.

Of course, other scanlines such as lines along the image geometry; x, y, z lines along fixed directions based on an expected left ventricle long axis and the like, can be traced by the scanline tracing device 110. Other similar rules can be used to recognize other regions of interest.

In one embodiment, the area under one or more peaks is evaluated. For example, a broad high intensity area under the single peak can be used to identify a liver. The presence of one or more high and narrow peak(s) can be an indication that there are reconstruction artifacts in the region of interest.

In one embodiment, an object of interest, such as a heart, is recognized by using a model, such as a geometrical model or a geometrical mathematical function, which are known in the art. For example, as described above, the image is segmented into the regions of potential interest, the object of interest is identified as a heart based on the set of the application specific rules and the long/short axes are determined by fitting the heart model. As another example, after the long and short axes are initially determined by the long/short axes determining device 126, a model fitting method can use the short/long axes as start values for more precise determination of the short/long axes, which makes the procedure more robust, and provides diagnostically more relevant axes directions as output.

With reference again to FIGS. 1 and 4, the object segmentation device, algorithm, processor or means 46 segments a recognized object of interest from the rest of the tissue based on a localized threshold 132 obtained from the average grayscale values and other statistical properties of the region of interest 86 which includes the particular object of interest. In this manner, the boundaries of the particular object of interest are drawn more accurately, dependent on the anatomy of the recognized object of interest.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

Having thus described the preferred embodiments, the invention is now claimed to be:

1. An apparatus comprising:
   a potential region of interest segmentation device which segments an image data into regions of potential interest, the potential region of interest segmentation device performing a watershed transform which segments the image data in a topographic fashion starting at seed points and propagating until two regions including two adjacent seed points meet;
   an identifying device which, from the regions of potential interest, identifies a region of interest including an object of interest based on a set of rules; and
   a recognizing device which differentiates among the identified objects of interest and selects at least one particular object of interest.

2. The apparatus as set forth in claim 1, further including:
   an object segmentation device which determines boundaries of the selected object of interest based on a localized threshold determined from the region of interest, which includes the selected object of interest, and isolates the selected object of interest from other tissue.

3. The apparatus as set forth in claim 1, wherein the watershed transform starts at the seed points with highest grayscale values and propagates down circumferentially in grayscale values such that regions dividing lines are formed where pixels with lowest grayscale values are found.

4. The apparatus as set forth in claim 1, wherein the set of rules includes at least one of:
   rules for identifying a heart;
   rules for identifying a tumor;
   rules for identifying a liver; and
   rules excluding artifacts.

5. The apparatus as set forth in claim 4, further including:
   a criteria selecting device which selects rules for identifying the region of interest based at least on an associated object of interest.

6. One of a PET and SPECT imaging system for performing the steps of (1) segmenting an image data into regions of potential interest, (2) from the regions of potential interest, identifying a region of interest including one or more objects of interest identified based on a set of rules, (3) differentiating among the identified objects of interest, and (4) selecting at least one particular object of interest.

7. The system as set forth in claim 6, wherein the selecting of at least one object of interest includes:
   determining first, second and third principal axes in the identified object of interest;

scanning along determined principal axes; and
counting a number of maxima points, the object of interest being selected based on the count.

8. The system as set forth in claim 7, wherein, based on the count, the selected object of interest includes at least one of a left ventricle of a heart and a tumor.

9. The system as set forth in claim 7, wherein the selecting further includes:
determining, based on the count, a long axis and short axes in the identified object of interest which short axes lie perpendicularly to the long axis.

10. The system as set forth in claim 6, further performing the steps of:
determining boundaries of the selected object of interest based on localized threshold determined from the region of interest which includes the selected object of interest; and
isolating the selected object of interest from other tissue.

11. The system as set forth in claim 6, wherein the set of rules includes at least one of:
rules for identifying a heart;
rules for identifying a tumor;
rules for identifying a liver; and
rules excluding artifacts.

12. The system as set forth in claim 11, further performing the steps of:
selecting rules for identifying the region of interest based at least on a particular object of interest.

13. An imaging method comprising:
segmenting an image data into regions of potential interest, wherein the segmenting includes performing a watershed transform;
from the regions of potential interest, identifying a region of interest including one or more objects of interest identified based on a set of rules;
differentiating among the identified objects of interest; and
selecting at least one particular object of interest.

14. The method as set forth in claim 13, further including:
starting at points with highest grayscale values;
propagating regions down in grayscale values; and
defining regions dividing lines.

15. An imaging method comprising:
segmenting an image data into regions of potential interest;
from the regions of potential interest, identifying a region of interest including one or more objects of interest identified based on a set of rules;
differentiating among the identified objects of interest wherein the differentiating includes:
determining principal axes of rotation in the identified object of interest,
scanning along determined principal axes,
counting a number of maxima points, and
selecting the object of interest based on the count; and
selecting at least one particular object of interest.

16. The method as set forth in claim 15, wherein, based on the count, the selected object of interest includes at least one of a left ventricle of a heart and a tumor.

17. The method as set forth in claim 15, further including:
based on the count, determining a longest axis in the identified object of interest; and
determining at least one short axis in the identified object of interest which short axis lies perpendicularly to the longest axis.

18. A processor programmed to perform the steps of:
segmenting an image data into regions of potential interest;
based on a set of rules, identifying a particular object of interest in one region of potential interest;
fitting a pre-selected model with the identified object of interest;
determining a long axis in the identified object of interest; and
determining two short axes in the identified object of interest, the short axes extending perpendicularly to the long axis.

* * * * *